May 31, 1938. K. FREY 2,119,158

METALLIC PACKING

Filed Nov. 26, 1935

Inventor:
Karl Frey
By Charles Appleman
Attorney

Patented May 31, 1938

2,119,158

UNITED STATES PATENT OFFICE 2,119,158

METALLIC PACKING

Karl Frey, Dueren, Germany

Application November 26, 1935, Serial No. 51,700
In Germany November 30, 1934

5 Claims. (Cl. 288—1)

By reason of its high resistance to heat, asbestos is used to a large extent as a packing medium at those places where high temperatures occur. When high pressure strains also occur, as for example, is the case at the places of connection of exhaust pipes or at the cylinder head joints of explosion and combustion engines, it is necessary to increase the strength of the gaskets by metal foils, as asbestos is only capable of very low resistance to mechanical strains. A considerable disadvantage of such asbestos packing resides in that the packing mass, when in use, and particularly when it is first subjected to high temperature shrinks considerably. Such a packing has to be tightened-up again a few days after insertion. When once the packing has been compressed to its smallest thickness it does not again expand when the bolts are loosened. Such asbestos packing can therefore only be used once. In order to increase the ability of withstanding mechanical strains, the flat sides of the packing are frequently covered with thin metal foils. After use for a long time, the asbestos however becomes so friable and dried that narrow packing strips thereof and the like frequently break notwithstanding the metal foil.

It has been proposed to reinforce asbestos packings by insertions of wire or metal fabrics, but, however, the elasticity of the fabric was not increased thereby.

The present invention relates to a packing for high pressure and temperature strains which does not possess the above described disadvantages. According to the invention the packing consists of a plurality of layers of fabric with any type of binding and formed by any method of plaiting, of metal, iron, steel or an alloy, whilst the layers of each gasket are edged by metal foil. Preferably, the separate layers of the metal fabric are connected together by interweaving.

In the accompanying drawing are illustrated, by way of example, two constructions of packing according to the invention.

Figure 1:
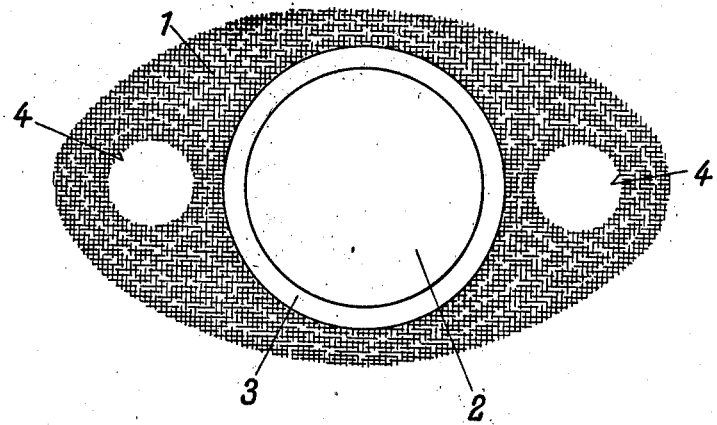
Fig. 1 shows an exhaust packing joint in plan view, approximately in its actual size.
Figure 2:
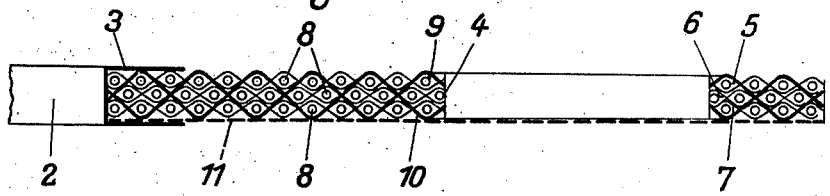
Fig. 2 is a cross section through one half of Fig. 1 drawn to a larger scale.

The gasket or packing plate 1, which in accordance with the purpose to which it is to be put may have any suitable shape, consists of two or more layers of metal fabric or wire netting. The openings 2 are edged with a metal foil 3 in such a manner that the edges of the metal foil are so bent over that they bear against the flat sides of the packing as shown in Fig. 2. The width of the bent-over edges may be varied. Other apertures in the plate 1, as, for example, the boltholes 4, need not be edged.

The fabric for the gasket 1 consists, for example, of three layers, 5, 6, 7, which, if desired, are located one above the other in such manner that the weft threads 8 of one layer are located in the gaps between the weft strands of the next adjacent layer. The various layers 5, 6, 7 are connected together by weaving separate warp threads 9, 10, through all the layers. The method of binding each of the separate layers 5, 6, or 7 and also of the complete fabric is of no importance in the present case. The most preferable method appears to be a binding by which as high a degree of elasticity as possible is obtained.

The production of such gaskets or packing is effected by stamping or cutting the same from a completely woven plate, whereupon the passages are then edged in the manner above referred to with the metal foil.

If desired, metal foils may be provided on one or both of the flat sides of the packing, according to the invention, as shown by the broken line 11 in Fig. 2 on the underside of the plate.

When clamping a gasket between the two parts to be packed, the clamping pressure is taken up by the entire plate. By reason of the elasticity of the multi-layer fabric any irregularities are directly equalized, which is not always the case with asbestos packing as knots or lumps and the like frequently limit the degree of compressibility. The actual packing strain, as was otherwise also the case with the previously known devices, is absorbed by the parts directly surrounding the passage openings 2, edged with a metal foil as hereinbefore described, which in consequence of the strong support that they receive from the remaining parts of the fabric, are capable of withstanding the highest strains.

Figure 3:
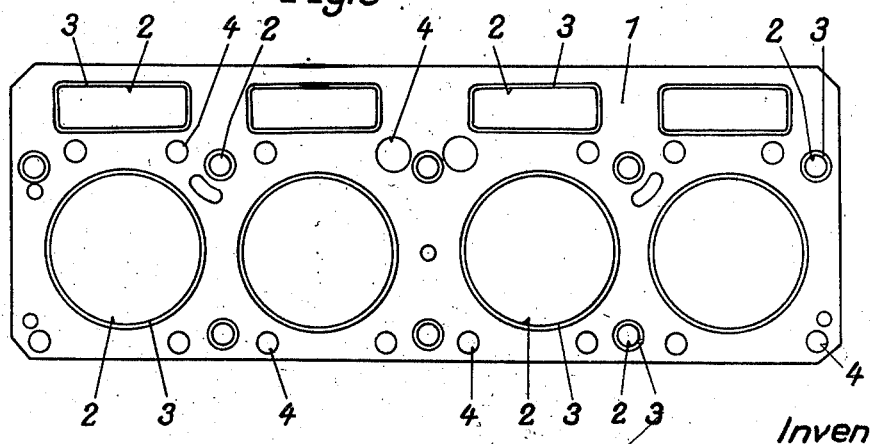
Fig. 3 shows a cylinder head packing in plan.

As confirmed by experiments, the packing according to the present invention swells again very considerably after being relieved of load. Consequently, it is possible to use the same packing a number of times, which was usually not the case with the packing plates heretofore employed. Further, such a packing may be firmly clamped immediately after insertion and needs to be tightened up only once, subsequent tightening-up not being necessary. A particular advantage of the packing according to the invention resides in the advantageous heat conductivity which renders the packing particularly suitable, for example, for use as a cylinder head gasket as shown in Fig. 3.

The wire for the fabric 1 may consist of any suitable metal, for example, copper, brass, bronze, iron, steel, or the like. The wire may be of any suitable profile or section. The edging 3 is preferably made of copper or iron and in the case of high strains, of nickel or any other metals or alloys.

Occasionally it may be advisable to fill the hollow spaces of the fabric 1 by filling substances of any suitable type or to coat the fabric on both sides with compact nonmetallic packing media.

I claim:

1. Packing, particularly for high pressures and temperatures, comprising a plurality of layers of metallic fabric, said packing being formed to provide an orifice therethrough, the edges of said orifice being reinforced by metallic foil, metallic coverings for the flat surfaces of the packing, and one or more metallic threads connecting the separate layers of metallic fabric together.

2. A packing plate, particularly for high pressure and temperature strains, comprising a plurality of metal fabric layers, weft threads of each layer being located in the gaps between the weft threads of adjacent layers, warp threads woven through said layers, said warp threads connecting the layers, said packing being formed to provide an orifice through said plate and a metal edging to said orifice.

3. A packing plate, particularly for high pressure and temperature strains, comprising a plurality of metal fabric layers, weft threads of each layer being located in the gaps between the weft threads of adjacent layers, warp threads woven through said layers, said warp threads binding the layers, said packing being formed to provide an orifice through the plate, a metal edging to said orifice, and a metal surface to the plate.

4. A packing plate, particularly for high pressure and temperature strains, comprising a plurality of fabric layers, weft threads of each layer being located between the weft threads of adjacent layers, warp threads woven in and between said layers and connecting the same, said packing being formed to provide an orifice through the plate, a metal foil edging to said orifice, and a metal surface for the plate.

5. A packing plate, particularly for high pressure and temperature strains, comprising a plurality of fabric layers, weft threads of each layer being located between the weft threads of adjacent layers, warp threads woven in and between said layers, said warp threads connecting the layers, filling material disposed in the hollow spaces, said packing being formed to provide an orifice through the plate, a metal foil edging to said orifice and a metal surface for the packing plate.

KARL FREY.